(12) United States Patent
Uh

(10) Patent No.: US 7,981,542 B2
(45) Date of Patent: Jul. 19, 2011

(54) RECHARGEABLE BATTERY

(75) Inventor: Hwail Uh, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 571 days.

(21) Appl. No.: 12/053,040

(22) Filed: Mar. 21, 2008

(65) Prior Publication Data
US 2009/0061306 A1 Mar. 5, 2009

(30) Foreign Application Priority Data

Sep. 5, 2007 (KR) .................. 10-2007-0090072

(51) Int. Cl.
*H01M 2/06* (2006.01)
(52) U.S. Cl. .................. 429/177; 429/180; 429/182
(58) Field of Classification Search .................. 429/177, 429/180, 182
See application file for complete search history.

(56) References Cited

U.S. PATENT DOCUMENTS

| | | | | |
|---|---|---|---|---|
| 6,190,798 | B1 * | 2/2001 | Okada et al. | 429/182 X |
| 7,427,454 | B2 * | 9/2008 | Uh | 429/174 |
| 2006/0093907 | A1 * | 5/2006 | Jeon et al. | 429/180 |
| 2006/0099490 | A1 * | 5/2006 | Cho et al. | 429/182 X |

FOREIGN PATENT DOCUMENTS

| | | |
|---|---|---|
| CN | 1753232 A | 3/2006 |
| JP | 07-105919 | 4/1995 |
| JP | 2000-113865 | 4/2000 |
| JP | 2002-343315 | 11/2002 |
| KR | 2006-28188 | 3/2006 |
| KR | 10-0601512 | 7/2006 |
| KR | 10-0614357 | 8/2006 |
| KR | 10-670428 | 1/2007 |
| KR | 10-709873 | 4/2007 |
| KR | 2007-67782 | 6/2007 |

OTHER PUBLICATIONS

Japanese Patent Abstracts and English machine translation for the above listed Japanese Publication 07-105919, (Doc date Apr. 1995).
Japanese Patent Abstracts and English machine translation for the above listed Japanese Publication 2000-113865, (Doc date Apr. 2000).
Japanese Patent Abstracts and English machine translation for the above listed Japanese Publication 2002-343315, (Doc date Nov. 2002).

(Continued)

*Primary Examiner* — Stephen J. Kalafut
(74) *Attorney, Agent, or Firm* — Christie, Parker & Hale, LLP

(57) ABSTRACT

A rechargeable battery including: an electrode assembly; a can to house the electrode assembly; and a cap assembly to seal an opening of the can. The cap assembly includes: a cap plate; an insulation plate disposed upon a lower surface of the cap plate; a terminal plate disposed upon a lower surface of the insulation plate; and an electrode terminal extending through the cap plate, the insulation plate and the terminal plate, and which is electrically coupled to the electrode assembly. The cap plate includes a seat part defined therein, which has a thickness that is less than an overall thickness of the cap plate. The insulation plate is seated in the seat part, which has a width is the same as an overall width of the cap plate.

20 Claims, 5 Drawing Sheets

OTHER PUBLICATIONS

Korean Patent Abstracts for Korean Publication 10-2006-0028176, dated Mar. 29, 2006 corresponding to Korean Patent 10-0601512 listed above.

Korean Patent Abstracts for Korean Publication 10-2006-0059703, dated Jun. 2, 2006 corresponding to Korean Patent 10-0614357 listed above.

* cited by examiner

RECHARGEABLE BATTERY

CROSS-REFERENCE TO RELATED APPLICATION

This application is based on, and claims priority to, Korean Application No. 2007-90072, filed Sep. 5, 2007, in the Korean Intellectual Property Office, the disclosure of which is incorporated herein by reference.

BACKGROUND OF THE INVENTION

1. Field of the Invention

Aspects of the present invention relate to a rechargeable battery, and more particularly, to a rechargeable battery having an improved cap assembly.

2. Description of the Related Art

Currently, rechargeable batteries have been developed for use as a main power supply in portable electronic devices, such as, a video camera, a cellular phone, a portable computer, and others.

The rechargeable batteries include, for example, nickel-cadmium batteries, nickel-hydrogen batteries, nickel-zinc batteries, and lithium batteries. The lithium rechargeable batteries have been widely used in advanced electronic devices, because such batteries can be miniaturized, have a high capacity, a high operating voltage, and a high energy density per unit weight.

The size and capacity of a lithium battery are very important factors in determining the performance of the battery, according to the rapid development of lightweight and small-sized portable electronic devices. Therefore, improved battery components, which can increase a capacity of the battery, are sought after. Further, assembling errors and defects should be reduced when the components are miniaturized.

SUMMARY OF THE INVENTION

Aspects of the present invention provide a rechargeable battery that is miniaturized, has a high capacity, and comprises a thin a cap assembly.

Aspects of the present invention provide a rechargeable battery that has components that provide for a compact cap assembly.

According to one aspect of the present invention, there is provided a rechargeable battery, which comprises: an electrode assembly; a can to house the electrode assembly; and a cap assembly. The cap assembly includes: a cap plate to seal an upper opening of the can; an insulation plate provided on a lower surface of the cap plate; a terminal plate provided on a lower surface of the insulation plate; and an electrode terminal extending through through-holes of the cap plate, insulation plate, and terminal plate, so as to be electrically coupled to the electrode assembly. The cap plate includes a seat part defined on a lower surface thereof, and the insulation plate is seated in the seat part, whose width is the same as that of the cap plate.

According to aspects of the present invention, the seat part may include a positioning part to align the insulation plate with the cap plate.

According to aspects of the present invention, the positioning part may be a projection that extends into the seat part. The insulation plate may include a groove to interface with the positioning part. The positioning part may be a groove that extends away from the seat part, and the insulation plate may include a projection that interfaces with the positioning part.

According to aspects of the present invention, the positioning part may include walls disposed on opposing edges of the seat part, to align one side of the insulation plate. The positioning part may be an arc-shaped wall disposed at one end of the seat part, and the insulation plate may include a correspondingly shaped end, to interface with the positioning part.

According to aspects of the present invention, the insulation plate may include a rotation preventing wall, to interface with an end of the terminal plate. The end of the terminal plate is aligned and secured by the wall, and may be narrower than the terminal plate.

According to aspects of the present invention, the seat part includes a through-hole through which the electrode terminal extends. The seat part may have a thickness that is about 20-40% less than an overall thickness of the cap plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
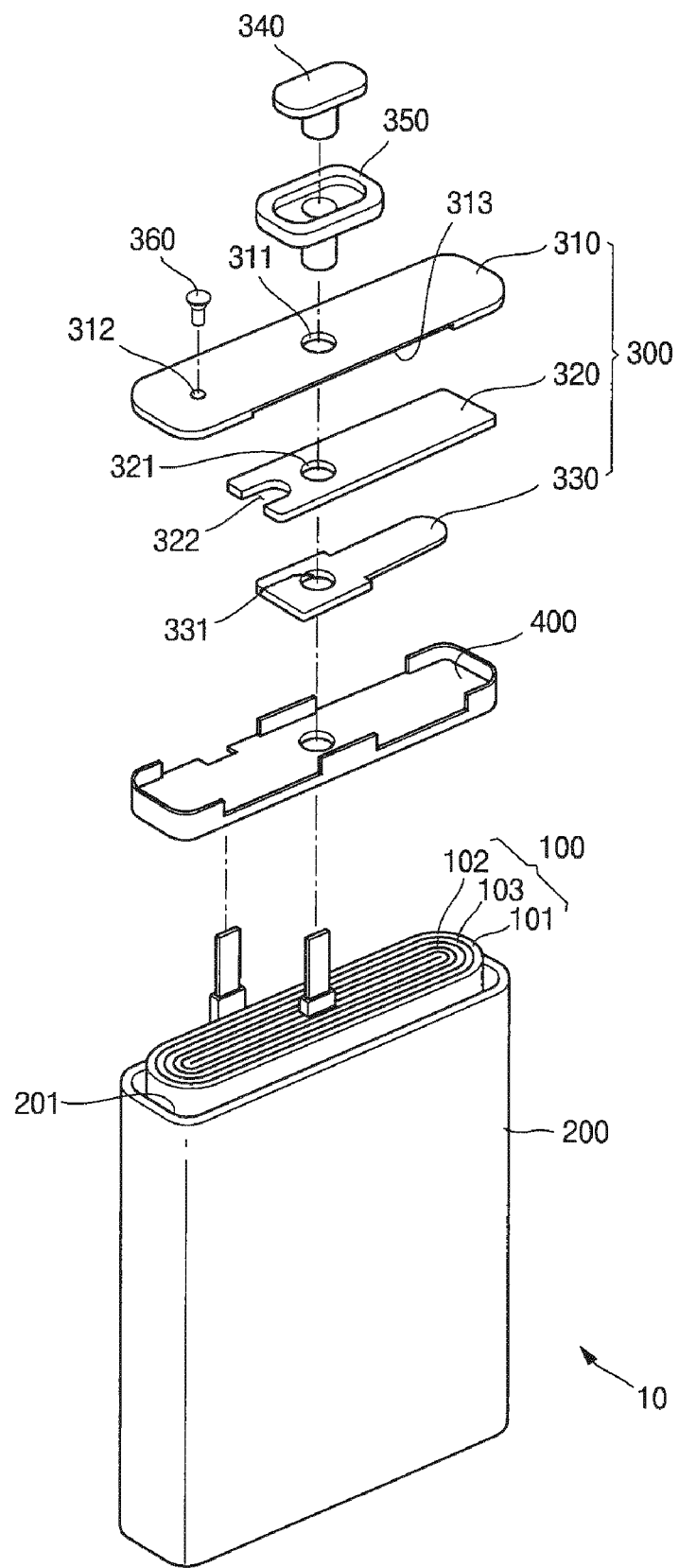
FIG. 1 is an exploded perspective view illustrating a rechargeable battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
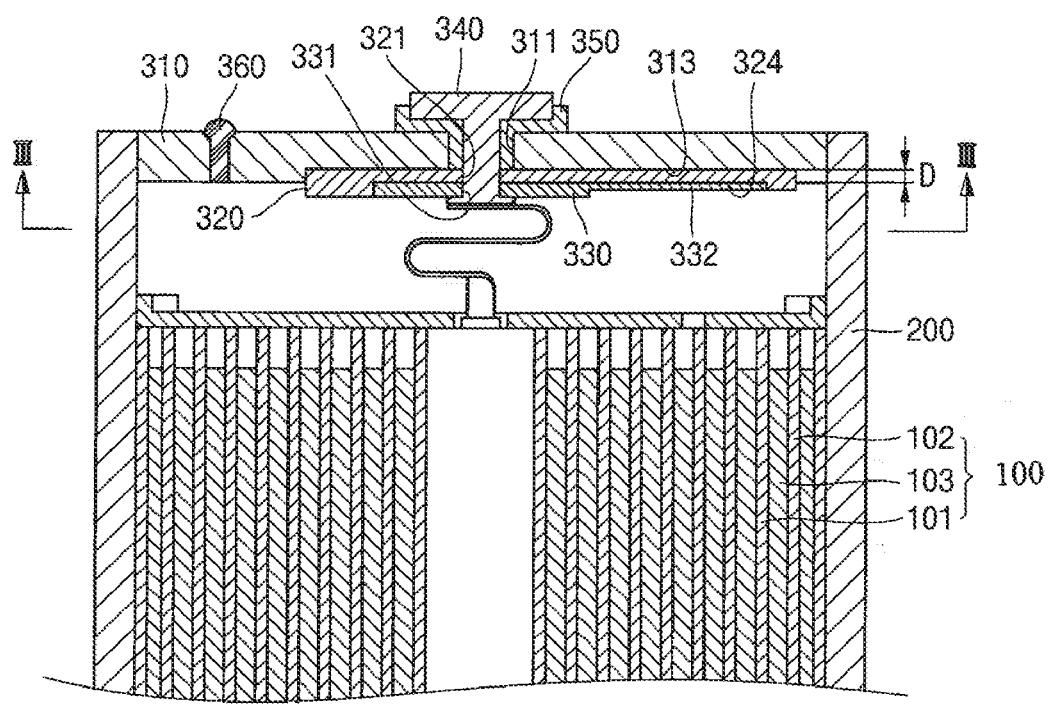
FIG. 2 is a sectional view illustrating the battery of FIG. 1.
Figure 3:
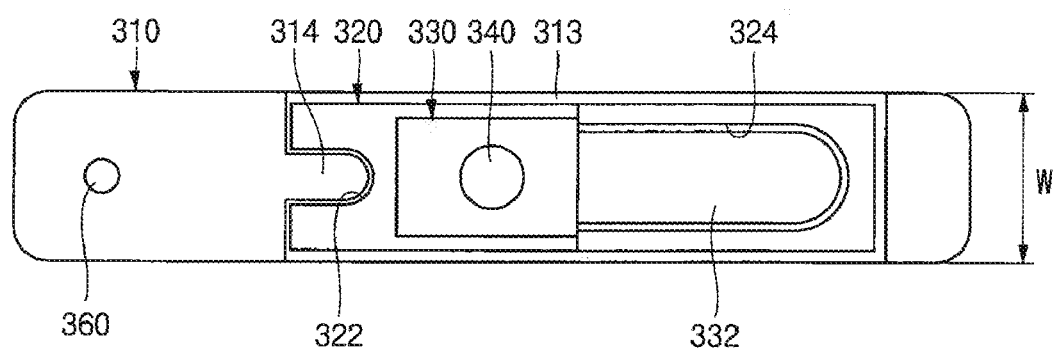
FIG. 3 is a sectional view taken along 'III-III' line of FIG. 2.
Figure 4:
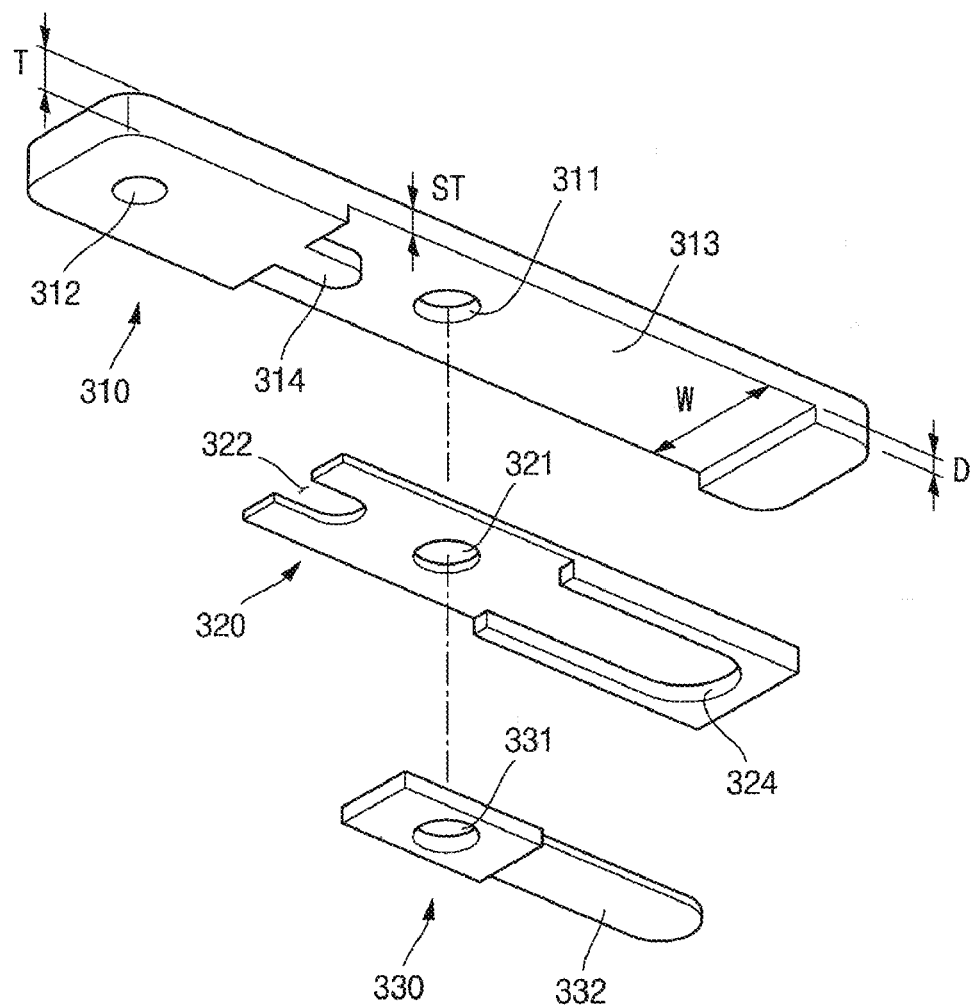
FIG. 4 is an exploded perspective view illustrating a cap assembly, according to an exemplary embodiment of the present invention.

FIG. 1 is an exploded perspective view illustrating a rechargeable battery 10, according to an exemplary embodiment of the present invention, FIG. 2 is a sectional view illustrating the battery 10 of FIG. 1, FIG. 3 is a sectional view illustrating a lower surface of a cap assembly of FIG. 2, and FIG. 4 is an exploded perspective view illustrating the cap assembly.

Referring to FIGS. 1 to 4, the rechargeable battery 10 includes an electrode assembly 100, a can 200 to house the electrode assembly 100, and a cap assembly 300 to seal an upper opening of the can 200.

The electrode assembly 100 includes a first electrode plate 101, a second electrode plate 102, and a separator 103. The electrode assembly 100 is housed in the can 200, together with an electrolytic solution (not shown). The can 200 is formed in a substantially rectangular shape, with an opening 201, and is usually made of a metal, such as aluminum. The cap assembly 300 includes the cap plate 310, an insulation plate 320, a terminal plate 330, and an electrode terminal 340, and seals the open end of the can 200. The cap plate 310 includes a seat part 313, formed on a lower surface thereof, which receives the insulation plate 320.

The cap plate 310 is a metal plate having a size and a shape corresponding to the opening 201 of the can 200. A terminal hole 311 is formed at a middle part of the cap plate 310. The electrode terminal 340 is inserted into the terminal hole 311. A tubular gasket 350 is disposed on an outer surface of the electrode terminal 340, to insulate the electrode terminal 340 from the cap plate 310. An electrolytic solution inlet 312 is formed at one side of the cap plate 310, and is closed by a stopper 360.

The seat part 313 is formed by a forging process, on the lower surface of the cap plate 310. The seat part 313 has a width W that is the same width as a width of the cap plate 310. The seat part 313 includes the terminal hole 311.

Because the width W of the seat part 313 is the same as that of the cap plate 310, the insulation plate 320 can be more easily applied to the seat part 313. Further, errors when assembling the insulation plate 320 with the seat part 313 are reduced, thereby improving assembling performance.

The depth D of the seat part 313 is generally more than about 20%, and less than about 40%, of an overall thickness T of the cap plate 310. When the depth D is less than about 20% of the overall thickness T of the cap plate 310, the insulation plate 320 may extend past a lower surface of the cap assembly 300. Further, when the depth D is more than about 40% of the overall thickness T of the cap plate 310, the seat part 313 may be too thin, so as to decrease the strength of the cap plate 300, as a whole. For example, when the cap plate 310 has an overall thickness T of 10 mm, the depth D of the seat part 313 is in a range of about 2 to 4 mm. In other words, a thickness ST of the seat part 313 can be from 80-60% the overall thickness T.

A positioning part 314 is extends into the seat part 313, along the length (long axis) of the cap plate 310. An end of the positioning part 314 is curved. That is, the positioning part 314 is generally U-shaped. The insulation plate 320 can be easily and precisely assembled to the seat part 313, and can be aligned in the seat part 313, by the positioning part 314.

The insulation plate 320 includes a terminal hole 321. A positioning groove 322 is formed in one side of the terminal hole 321. A rotation-preventing projection 324 is formed at an opposing side of the insulation plate 320. The terminal hole 321 is disposed to overlap with the terminal hole 311 of the cap plate 310. The electrode terminal 340 passes through the terminal hole 321.

The shape of the positioning groove 322 corresponds with a shape of the positioning part 314. Thus, the positioning groove 322 can be disposed around the positioning part 314. The shapes of the positioning part 314 and positioning groove 322, are not limited thereto, and can be any suitable corresponding shapes.

The rotation preventing projection 324 is formed on a lower surface of the insulation plate 320. The rotation preventing projection 324 aligns the terminal plate 330, on the lower surface of the insulation plate 320, and prevents the terminal plate 330 from being twisted laterally, or rotated, with respect to the insulation plate 320.

The terminal plate 330 includes a terminal hole 331 disposed at an end thereof, and an insertion part 332 formed at an opposing end thereof. The terminal hole 331 is formed so as to be aligned with the terminal hole 311 of the cap plate 310, and the terminal hole 321 of the insulation plate 320, with the electrode terminal 340 passing there through.

The insertion part 332 is disposed in the rotation preventing projection 324 of the insulation plate 320. The rotation preventing projection 324 prevents the terminal plate 330 from twisting or rotating about the insulation plate 320.

The insulation plate 320 has a relatively smaller width than the cap plate 310. Thus, the insulation plate 320 is located within the seat part 313, on the lower surface of the cap plate 310. The terminal plate 330 has a relatively smaller width than that of the insulation plate 320, and thus, the terminal plate 330 is located on the lower surface of the insulation plate 320.

An assembling process of the rechargeable battery 10 will now be explained. The electrode assembly 100, and an electrolytic solution, are received in the can 200. The opening 201 of the can 200 is closed by the cap assembly 300. The cap assembly 300 is formed by assembling the cap plate 310 with the insulation plate 320, assembling the terminal plate 330 on the lower surfaces thereof, and inserting the electrode terminal 340 through the through-holes 311, 321, and 331, of the cap plate 310, the insulation plate 320, and the terminal plate 330. The electrode terminal 340 is electrically coupled to the terminal plate 330.

The insulation plate 320 is disposed in the seat part 313 formed on the lower surface of the cap plate 310. The positioning part 314, which extends into the seat part 313, interfaces with the positioning groove 322 of the insulation plate 320. Thus, the insulation plate 320 is easily and precisely aligned with the lower surface of the cap plate 310.

The terminal plate 330 is disposed upon the lower surface of the insulation plate 320. The insertion part 332, of the terminal plate 330, is seated in the rotation preventing projection 324, which formed on the lower surface of the insulation plate 320. After the terminal plate 330 is assembled with the insulation plate 320, the insertion part 332 is not separated from the rotation preventing projection 324, and the terminal plate 330 is not twisted about the insulation plate 320.

The insulation plate 320 is disposed upon the seat part 313 of the cap plate 310, and the terminal plate 330 is disposed within the rotation preventing projection 324, formed on the lower surface of the insulation plate 320. Thus, a thickness and volume of the cap assembly 300 are reduced. For example, an overall thickness T of the cap plate 310, can be approximately equal to the combined thicknesses of the seat part 313, the insulation plate 320, and the terminal plate 330. In other words, the thickness of the cap assembly 300 can be approximately equal to the overall thickness of the cap plate 310.

The positioning groove 322 is combined with the positioning part 314, so that the insulation plate 320 is aligned with the cap plate 310, thereby allowing the assembling process to be accurate and easy. Further, the insertion part 332 is inserted into the rotation preventing projection 324, formed on the lower surface of the insulation plate 320, when the terminal plate 330 is attached to the insulation plate 320, thereby allowing the assembling process to be accurate and easy. Accordingly, it is possible for an operator to simply achieve the assembling process, without directly confirming the position of the insulation plate 320 with respect to the lower surface of the cap plate 310, and the position of the terminal plate 330 with respect to the lower surface of the insulation plate 320. Further, after assembling, the insulation plate 320 and terminal plate 330 are not released, twisted, or rotated with respect to one another.

Reference numeral 400 indicates an insulation cover, which is inserted into the upper part of the electrode assembly 100, before the cap assembly 300 is sealed.

Figure 5A:
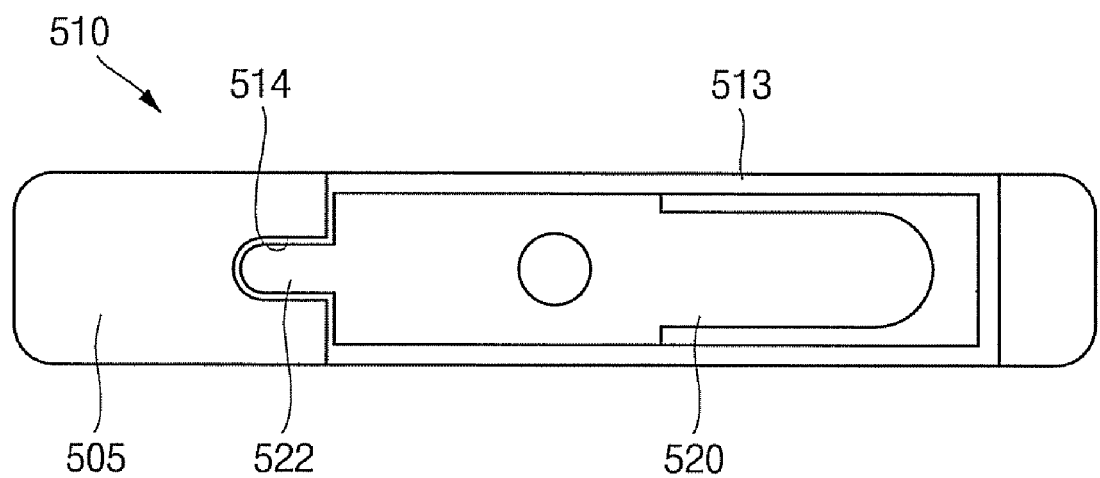
FIGS. 5A to 5C are plan views illustrating cap assemblies, according to exemplary embodiments of the present invention.
Figure 5B:
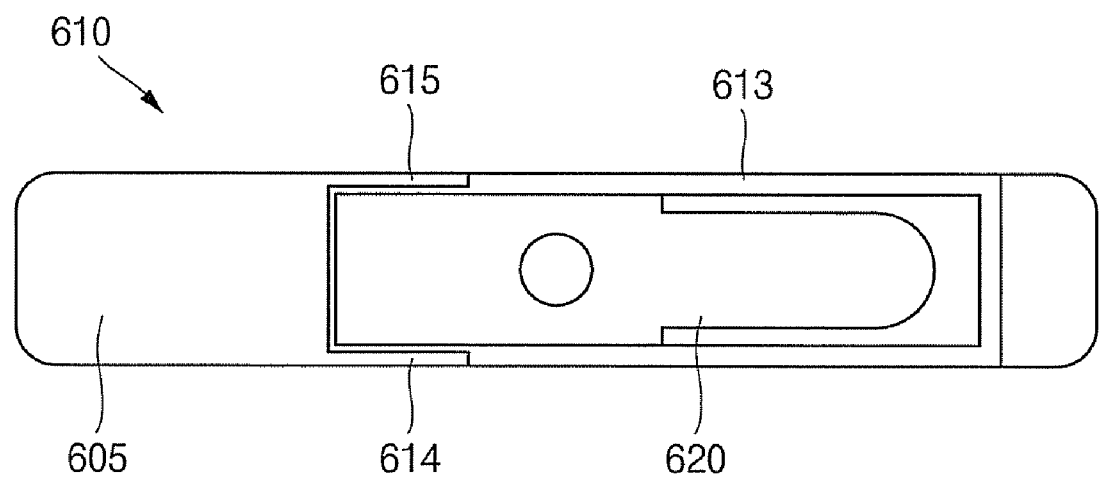
Figure 5C:
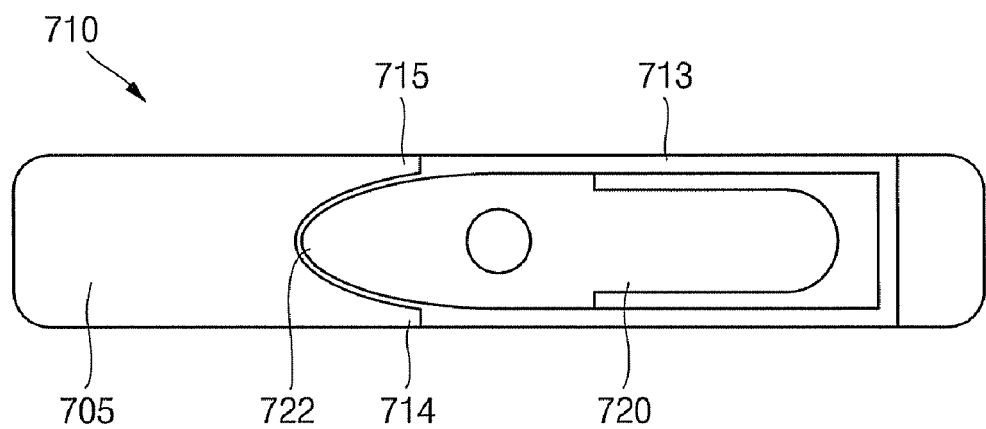

FIGS. 5A to 5C are views illustrating cap assemblies, according to exemplary embodiments of the present invention. Referring to FIG. 5a, the cap assembly 510 includes a seat part 513 formed on a lower surface of a cap plate 505, and a positioning part 514 extending from the seat part 513.

The positioning part 514 is a groove extending from the seat part 513. An insulation plate 520, having a positioning projection 522 that is shaped to correspond with the positioning part 514, is disposed in the seat part 513. Thus, the positioning projection 522 disposed within the positioning part 514. That is, the insulation plate 520 is aligned with the cap plate 505.

FIG. 5B is a plan view illustrating a cap assembly 610, according to still another exemplary embodiment of the present invention. The cap assembly 610 includes a cap plate 605 that includes a seat part 613 formed on a lower surface thereof, and positioning parts (walls) 614 and 615 formed on opposing sides the seat part 613.

Each of the positioning parts 614 and 615 project from the cap plate 605, on opposing sides of the seat part 613. The positioning parts 614 and 615 align one end of an insulation plate 620 with the cap plate 605, during an assembly thereof. Thus, the insulation plate 620 is assembled in the seat part 613 of the cap plate 605, without a separate alignment process.

FIG. 5C is a plan view illustrating a cap assembly 710, according to still another exemplary embodiment of the present invention. The cap assembly 710 includes a cap plate 705 that is similar to the cap plate 605 of FIG. 5B, except that a seat part 713 is formed on a lower surface of the cap plate 705, and positioning parts 714 and 715 (walls) are respectively formed in a longitudinal (long axis) direction of the cap plate 705, along opposing edges of the seat part 713.

Here, the positioning parts 714 and 715 together form an arc-shaped wall. An end 722 of an insulation plate 720, which has a shape that corresponds to that of the wall, is disposed within the positioning parts 714 and 715. The end 722 of the insulation plate 720 aligned by the positioning parts 714 and 715 on a surface of the seat part 713.

As described above, the rechargeable battery 10, according to aspects of the present invention, can include any of the cap assemblies 300, 510, 610, and 710. The cap assemblies 300, 510, 610, and 710 produce the following effects. First, the overall thickness of a cap assembly can be reduced, by reducing an installation space of an insulation plate and a terminal plate, assembled on the lower surface of a cap plate, thereby reducing the height of the battery in general, and the thickness of the cap assembly in particular. Second, the components of the battery can be precisely and easily assembled, thereby improving manufacturing productivity.

Although a few embodiments of the present invention have been shown and described, it would be appreciated by those skilled in the art that changes may be made in the exemplary embodiments, without departing from the principles and spirit of the invention, the scope of which is defined in the claims and their equivalents.

What is claimed is:

1. A rechargeable battery comprising:
an electrode assembly;
a can to house the electrode assembly; and
a cap assembly to seal an opening of the can, the cap assembly comprising:
a cap plate having a seat portion defined in a surface thereof;
an insulation plate disposed within the seat portion of the cap plate;
a terminal plate disposed upon the insulation plate; and
an electrode terminal extending through the cap plate, the insulation plate, and the terminal plate, and electrically coupled to the electrode assembly,
wherein the cap plate has an overall thickness that is greater than a depth of the seat portion, and the seat portion has a width that is equal to an overall width of the cap plate, and
wherein the insulation plate has an overall circumference that is located within the seat portion.

2. The rechargeable battery of claim 1, wherein the cap plate has a positioning portion, to align the insulation plate within the seat portion.

3. A rechargeable battery comprising:
an electrode assembly;
a can to house the electrode assembly; and
a cap assembly to seal an opening of the can, the cap assembly comprising:
a cap plate having a seat portion defined in a surface thereof;
an insulation plate disposed within the seat portion of the cap plate;
a terminal plate disposed upon the insulation plate; and
an electrode terminal extending through the cap plate, the insulation plate, and the terminal plate, and electrically coupled to the electrode assembly,
wherein the cap plate has an overall thickness that is greater than a depth of the seat portion, and the seat portion has a width that is equal to an overall width of the cap plate,
wherein the cap plate has a positioning portion, to align the insulation plate within the seat portion, and
wherein the positioning portion comprises a projection that extends into the seat portion, and the insulation plate has a groove disposed around the positioning portion.

4. A rechargeable battery comprising:
an electrode assembly;
a can to house the electrode assembly; and
a cap assembly to seal an opening of the can, the cap assembly comprising:
a cap plate having a seat portion defined in a surface thereof;
an insulation plate disposed within the seat portion of the cap plate;
a terminal plate disposed upon the insulation plate; and
an electrode terminal extending through the cap plate, the insulation plate, and the terminal plate, and electrically coupled to the electrode assembly,
wherein the cap plate has an overall thickness that is greater than a depth of the seat portion, and the seat portion has a width that is equal to an overall width of the cap plate,
wherein the cap plate has a positioning portion, to align the insulation plate within the seat portion, and
wherein the positioning portion is a groove that extends from an end of the seat portion, along a long axis of the cap plate, and the insulation plate includes a projection that is disposed within the positioning portion.

5. A rechargeable battery comprising:
an electrode assembly;
a can to house the electrode assembly; and
a cap assembly to seal an opening of the can, the cap assembly comprising:
a cap plate having a seat portion defined in a surface thereof;
an insulation plate disposed within the seat portion of the cap plate;

a terminal plate disposed upon the insulation plate; and an electrode terminal extending through the cap plate, the insulation plate, and the terminal plate, and electrically coupled to the electrode assembly, wherein the cap plate has an overall thickness that is greater than a depth of the seat portion, and the seat portion has a width that is equal to an overall width of the cap plate, wherein the cap plate has a positioning portion, to align the insulation plate within the seat portion, and wherein the positioning portion comprises walls disposed on opposing sides of an end of the seat portion.

6. A rechargeable battery comprising:

an electrode assembly a can to house the electrode assembly; and a cap assembly to seal an opening of the can, the cap assembly comprising:

a cap plate having a seat portion defined in a surface thereof;

an insulation plate disposed within the seat portion of the cap plate;

a terminal plate disposed upon the insulation plate; and an electrode terminal extending through the cap plate, the insulation plate, and the terminal plate, and electrically coupled to the electrode assembly, wherein the cap plate has an overall thickness that is greater than a depth of the seat portion, and the seat portion has a width that is equal to an overall width of the cap plate, wherein the cap plate has a positioning portion, to align the insulation plate within the seat portion, and wherein the positioning portion comprises an arc-shaped wall disposed around an end of the seat portion, and the insulation plate has an end disposed within the wall and which has a shape that corresponds to the shape of the wall.

7. A rechargeable battery comprising:

an electrode assembly;

a can to house the electrode assembly; and a cap assembly to seal an opening of the can, the cap assembly comprising:

a cap plate having a seat portion defined in a surface thereof;

an insulation plate disposed within the seat portion of the cap plate;

a terminal plate disposed upon the insulation plate; and an electrode terminal extending through the cap plate, the insulation plate, and the terminal plate, and electrically coupled to the electrode assembly, wherein the cap plate has an overall thickness that is greater than a depth of the seat portion, and the seat portion has a width that is equal to an overall width of the cap plate, and wherein the insulation plate has a wall disposed around an end of the terminal plate.

8. The rechargeable battery of claim 7, wherein the end of the terminal plate is disposed within the wall of the insulation plate, and the end of the terminal plate has a width that is less than an overall width of the terminal plate.

9. A rechargeable battery comprising:

an electrode assembly;

a can to house the electrode assembly; and a cap assembly to seal an opening of the can, the cap assembly comprising:

a cap plate having a seat portion defined in a surface thereof;

an insulation plate disposed within the seat portion of the cap plate;

a terminal plate disposed upon the insulation plate; and an electrode terminal extending through the cap plate, the insulation plate, and the terminal plate, and electrically coupled to the electrode assembly, wherein the cap plate has an overall thickness that is greater than a depth of the seat portion, and the seat portion has a width that is equal to an overall width of the cap plate, and wherein the seat portion includes a through-hole through which the electrode terminal is disposed.

10. The rechargeable battery of claim 1, wherein the depth of the seat portion is about 20-40% of the overall thickness of the cap plate.

11. The rechargeable battery of claim 1, wherein the overall thickness of the cap plate is about 10 mm, and the depth of the seat portion is about 2 mm.

12. The rechargeable battery of claim 1, wherein a thickness of the cap assembly is approximately equal to the overall thickness of the cap plate.

13. A cap assembly for sealing an opening of a can of a rechargeable battery, the cap assembly comprising:

a cap plate having a seat portion defined in a surface thereof, and a positioning portion adjacent to the seat portion;

an insulation plate disposed within the seat portion of the cap plate;

a terminal plate disposed upon the insulation plate; and an electrode terminal extending through the cap plate, the insulation plate, and the terminal plate, and electrically coupled to an electrode assembly in the can, wherein the seat portion has a depth that is about 20-40% of an overall thickness of the cap plate, and the positioning portion aligns the insulation plate with the cap plate, and wherein the insulation plate has an overall circumference that is located within the seat portion.

14. A cap assembly for sealing an opening of a can of a rechargeable battery, the cap assembly comprising:

a cap plate having a seat portion defined in a surface thereof, and a positioning portion adjacent to the seat portion;

an insulation plate disposed within the seat portion of the cap plate;

a terminal plate disposed upon the insulation plate; and an electrode terminal extending through the cap plate, the insulation plate, and the terminal plate, and electrically coupled to an electrode assembly in the can, wherein the seat portion has a depth that is about 20-40% of an overall thickness of the cap plate, and the position portion aligns the insulation plate with the cap plate, and wherein the positioning portion comprises a projection that extends into the seat portion, and interfaces with a groove of the insulation plate.

15. A cap assembly for sealing an opening of a can of a rechargeable battery, the cap assembly comprising;

a cap plate having a seat portion defined in a surface thereof, and a positioning portion adjacent to the seat portion;

an insulation plate disposed within the seat portion of the cap plate;

a terminal plate disposed upon the insulation plate; and an electrode terminal extending through the cap plate, the insulation plate, and the terminal plate, and electrically coupled to an electrode assembly in the can, wherein the seat portion has a depth that is about 20-40% of an overall thickness of the cap plate, and the positioning portion aligns the insulation plate with the cap plate, and wherein the positioning portion is a groove that extends from an end of the seat portion, along a long axis of the cap plate, and interfaces with a projection of the insulation plate.

16. A cap assembly for sealing an opening of a can of a rechargeable battery, the cap assembly comprising:
a cap plate having a seat portion defined in a surface thereof, and a positioning portion adjacent to the seat portion;
an insulation plate disposed within the seat portion of the cap plate;
a terminal plate disposed upon the insulation plate; and
an electrode terminal extending through the cap plate, the insulation plate, and the terminal plate, and electrically coupled to an electrode assembly in the can,
wherein the seat portion has a depth that is about 20-40% of an overall thickness of the cap plate, and the positioning portion aligns the insulation plate with the cap plate, and
wherein the positioning portion comprises walls disposed on opposing sides of an end of the seat portion.

17. A cap assembly for sealing an opening of a can of a rechargeable battery, the cap assembly comprising:
a cap plate having a seat portion defined in a surface thereof, and a positioning portion adjacent to the seat portion;
an insulation plate disposed within the seat portion of the cap plate;
a terminal plate disposed upon the insulation plate; and
an electrode terminal extending through the cap plate, the insulation plate, and the terminal plate, and electrically coupled to an electrode assembly in the can,
wherein the seat portion has a depth that is about 20-40% of an overall thickness of the cap plate, and the positioning portion aligns the insulation plate with the cap plate, and
wherein the positioning portion is an arc-shaped wall disposed around an end of the seat portion, to interface with a correspondingly shaped end of the insulation plate.

18. A cap assembly for sealing an opening of a can of a rechargeable battery, the cap assembly comprising:
a cap plate having a seat portion defined in a surface thereof, and a positioning portion adjacent to the seat portion;
an insulation plate disposed within the seat portion of the cap plate;
a terminal plate disposed upon the insulation plate; and
an electrode terminal extending through the cap plate, the insulation plate, and the terminal plate, and electrically coupled to an electrode assembly in the can,
wherein the seat portion has a depth that is about 20-40% of an overall thickness of the cap plate, and the positioning portion aligns the insulation plate with the cap plate, and
wherein the insulation plate comprises a wall to align an end to the terminal plate.

19. The cap assembly of claim 13, wherein a thickness of the cap assembly is approximately equal to the overall thickness of the cap plate.

20. The cap assembly of claim 13, wherein a width of the cap plate is greater than or equal to widths of the insulation plate and the terminal plate.

* * * * *

UNITED STATES PATENT AND TRADEMARK OFFICE
CERTIFICATE OF CORRECTION

| | | |
|---|---|---|
| PATENT NO. | : 7,981,542 B2 | Page 1 of 1 |
| APPLICATION NO. | : 12/053040 | |
| DATED | : July 19, 2011 | |
| INVENTOR(S) | : Hwail Uh | |

It is certified that error appears in the above-identified patent and that said Letters Patent is hereby corrected as shown below:

On the Title Page

(57) Abstract, line 12.     Delete "is"
                           Insert -- being --

In the Claims

Column 7, Claim 6, line 14.     Delete "assembly"
                               Insert -- assembly; --

Column 8, Claim 14, line 50.    Delete "position"
                               Insert -- positioning --

Column 8, Claim 15, line 56.    Delete "comprising;"
                               Insert -- comprising: --

Signed and Sealed this
Thirty-first Day of July, 2012

David J. Kappos
*Director of the United States Patent and Trademark Office*